United States Patent [19]

Tsuboka et al.

[11] 4,238,773
[45] Dec. 9, 1980

[54] TELEVISION RECEIVER FOR DISPLAY OF PLURAL VIDEO IMAGES INCLUDING A DISPLAYED BOUNDARY BETWEEN THE IMAGES

[75] Inventors: Eiichi Tsuboka, Neyagawa; Takeji Kimura, Toyonaka; Hirokazu Yoshino, Katano; Tatuo Fujita, Moriguchi; Masao Nakazawa, Nagaokakyo, all of Japan

[73] Assignee: Matsushita Electric Industrial Co., Ltd., Osaka, Japan

[21] Appl. No.: 973,970

[22] Filed: Dec. 28, 1978

[30] Foreign Application Priority Data

Dec. 29, 1977 [JP] Japan ................... 52-157702
Dec. 29, 1977 [JP] Japan ................... 52-157703

[51] Int. Cl.³ ............................................. H04N 9/535
[52] U.S. Cl. ...................................................... 358/183
[58] Field of Search ................. 358/183; 340/730, 734

[56] References Cited

U.S. PATENT DOCUMENTS

| | | | |
|---|---|---|---|
| 3,944,731 | 3/1976 | Busch | 358/183 |
| 4,070,695 | 1/1978 | Scholz | 358/183 |
| 4,134,128 | 1/1979 | Hurst | 358/22 |

FOREIGN PATENT DOCUMENTS 49-2419  1/1974  Japan ........................... 358/183

*Primary Examiner*—Robert L. Griffin
*Assistant Examiner*—Michael Allen Masinick
*Attorney, Agent, or Firm*—Stevens, Davis, Miller & Mosher

[57] ABSTRACT

A television receiver is disclosed, which receives two television signals and compresses a time axis of one of the television signals and inserts the compressed signal to a portion of the other television signal to display both signals on the same screen. A signal indicating a boundary of the two images is produced from a synchronizing signal derived from one of the two received television signals and the boundary indicating signal is superimposed on one or both of a brightness signal and a chrominance signal to display the boundary.

7 Claims, 22 Drawing Figures

FIG. 8
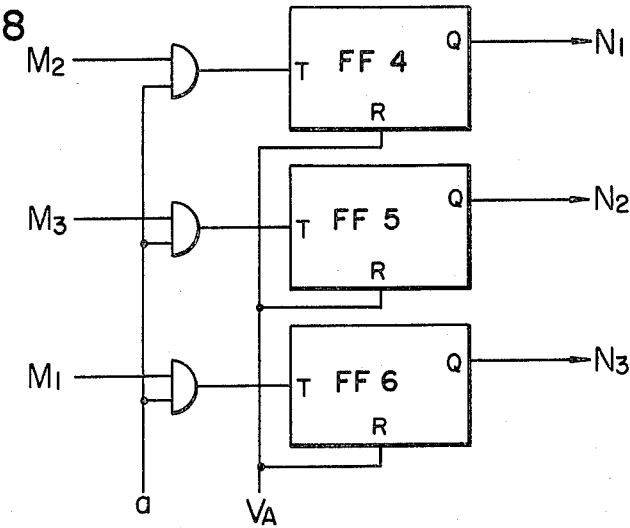
FIG. 9
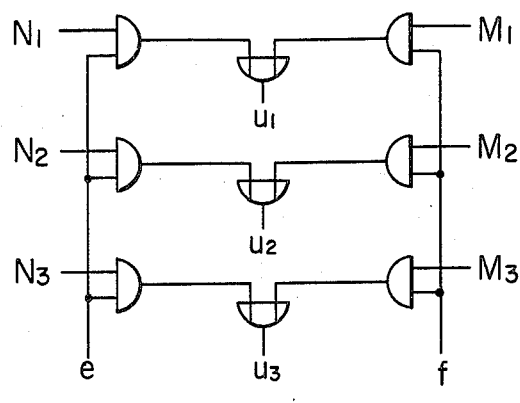
FIG. 10
| INPUT SELECTION CODE | | | | OUTPUT SIGNAL |
|---|---|---|---|---|
| $N_1$ | $N_2$ | $N_3$ | C | |
| 1 | 0 | 0 | 1 | q |
| 0 | 1 | 0 | 1 | r |
| 0 | 0 | 1 | 1 | s |
| * | * | * | 0 | p |
FIG. 11
| $M_1$ | $M_2$ | $M_3$ |
|---|---|---|
| — | — | — |
| 1 | 0 | 0 |
| 0 | 1 | 0 |
| 0 | 0 | 1 |
| 1 | 0 | 0 |
| — | — | — |

TELEVISION RECEIVER FOR DISPLAY OF PLURAL VIDEO IMAGES INCLUDING A DISPLAYED BOUNDARY BETWEEN THE IMAGES

BACKGROUND OF THE INVENTION

The present invention relates to a television receiver capable of simultaneously displaying two channel images on the same screen of the television receiver.

A method for displaying images of two channels A and B on the same screen as shown in FIG. 2 is disclosed in the Japanese Published Unexamined Patent Application No. 49-2419. In the disclosed method, the image of the channel B is displayed at a right lower corner with a vertical size being approximately ½ of the whole vertical size of the screen, a horizontal size being approximately ½ and an area being approximately ¼. A basic concept of the disclosed method lies in that samples which are sampled for every other picture element (sampling points necessary to reproduce the image) in one horizontal scan period for the channel B are stored in a memory circuit, and the content of the memory circuit is read out at a rate which is twice as high as a writing rate when a horizontal scan for the channel A sweeps an area B shown in FIG. 2. In this manner, an image signal for the channel B is displayed in the area B in FIG. 2 with the image being compressed to approximately ½ both vertically and horizontally.

FIG. 1 shows a specific configuration, in which numeral 1 denotes an antenna, 2 and 6 denote tuners for receiving broadcasting signals of different channels A and B, 3 and 7 denote video intermediate frequency amplifiers, 4 and 8 denote video detectors, 5 and 9 denote video amplifiers, 10 denotes a circuit for producing a vertical synchronizing signal $V_B$ and a horizontal synchronizing signal $H_B$ for the channel B, and 11 denotes a circuit for producing a vertical synchronizing signal $V_A$ and a horizontal synchronizing signal $H_A$ for the channel A. Numeral 12 denotes a flip-flop which changes its state each time the horizontal synchronizing signal $H_B$ is produced, and 13 denotes a signal selection circuit which selects one of an input signal p which is a video signal for the channel A and output signals q, r and s from a memory circuit which alternately stores signals for the channel B, depending on which one of signals C, $N_1$, $N_2$ and $N_3$ is applied, to provide the selected signal at an output terminal 23. The signal selection circuit 13 operates in a manner as shown in FIG. 10. Numerals 14 and 17 denote R-S flip-flops each having a set terminal and a reset terminal and they produce output signals a and b, respectively. Numerals 15 and 16 denote counters, and 18 denotes a gated oscillator which stops the oscillation when the horizontal synchronizing signal $H_A$ is present, so that the phase of the first pulse of its output relative to the horizontal synchronizing signal $H_A$ can be maintained constant. Numeral 19 denotes a gated oscillator which produces an output signal f which has a similar relation to the horizontal synchronizing signal $H_B$. Numeral 20 denotes a control circuit including a memory circuit for reading and writing image information and it includes circuits shown in FIGS. 5, 7, 8 and 9. Numerals 21 and 22 denote AND gates.

The oscillation frequency of the gated oscillator 18 is equal to 450 $f_H$ (Hz) when the number of picture elements in one horizontal scan period is equal to 450, where $f_H$ is a horizontal scan frequency, and the oscillation frequency of the gated oscillator 19 is equal to one half thereof, i.e., 225 $f_H$ (Hz). The counter 15 counts 525/2×2÷132 pulses, when the number of horizontal scans in one field is equal to 525/2, and it sets the flip-flop 14 to cause it to produce high voltage output a when the counter 15 has counted 132 horizontal synchronizing signals $H_A$. The counter 15 and the flip-flop 14 are reset by the vertical synchronizing signal $V_A$. The counter 16 counts 450/2=225 pulses when the number of picture elements in one horizontal scan period is equal to 450. When the counter 16 has counted 225 output pulses of the gated oscillator 18, it sets the flip-flop 17 so that the output b assumes a high voltage state. The counter 16 and the flip-flop 17 are reset by the horizontal synchronizing signal $H_A$. With this arrangement, when the area B shown in FIG. 2 is swept, the outputs a and b are at the high voltage state so that the output e of the AND gate 22 produces the output of the oscillator 18.

A broadcasting signal for the channel A, as shown in FIG. 4A, received by the tuner 2 is applied to the signal selection circuit 13 as the video signal p through the circuits 3, 4 and 5. A broadcasting signal for the channel B received by the tuner 6 is applied to the control circuit 20 through the circuits 7, 8 and 9. The control circuit 20 includes three analog memories each comprised of CCD or BBD and a control circuit for sequentially driving the analog memories. As shown in FIG. 4B, the control circuit 20 samples a video signal v and stores the samples in different analog memories for each field. The signals stored in the analog memory which has completed the writing are read out at a rate which is twice as high as the sampling rate. As a result, a video signal having a time axis compressed to ½ as shown in FIG. 4C is produced. Those video signals appear for each field as the signals q, r and s. The signal selection circuit 13 appropriately selects the signals p, q, r or s so that a video signal which is a combination of the video signals for the channel A and the channel B as shown in FIG. 4D and which corresponds to the image shown in FIG. 2 is produced at the terminal 23.

The circuits included in the control circuit 20 are shown in FIGS. 7 to 9. FIG. 7 shows a ring counter. Starting from any state of flip-flops $FF_1$, $FF_2$ and $FF_3$, when the vertical synchronizing signal $V_B$ triggers the flip-flops $FF_1$ to $FF_3$ a predetermined times, outputs $M_1$, $M_2$ and $M_3$ repeat an output state shown in FIG. 11 each time the synchronizing signal $V_B$ is received. The outputs $M_1$, $M_2$ and $M_3$ are used as the signals to select a write circuit. FIG. 8 shows a circuit which produces signals $N_1$, $N_2$ and $N_3$ from the signals $M_1$, $M_2$ and $M_3$ derived from the circuit shown in FIG. 7, the signal a and the synchronizing signal $V_a$. The signals $N_1$, $N_2$ and $N_3$ are used as the signal to select a read circuit and as the signal to select one of the signals p, q, r and s by the signal selection circuit 13.

FIG. 9 shows a circuit for producing a writing clock or a reading clock for the read and write circuits by selecting one of the output e of the oscillator 18 through the AND gate 22 and the output f of the oscillator 19 by the signals $M_1$, $M_2$, $M_3$, $N_1$, $N_2$ and $N_3$.

FIG. 5 shows the memory circuit included in the control circuit 20 and a circuit for writing the image information into and reading it from the memory circuit. Numeral 206 denotes the memory circuits and 205 denotes a shift register. Blocks 502 and 503 have the same configurations as a block 501. The block or circuit 501 receives the signals $M_1$, $N_1$ and $U_1$ while the circuits 502 and 503 receive $M_2$, $N_2$ and $U_2$, and $M_3$, $N_3$ and $U_3$, respectively. When $(M_1, M_2, M_3) = (1, 0, 0)$, the information is written in the circuit 501, when $(M_1, M_2, M_3) = (0, 1, 0)$, it is written in the circuit 502, and when $(M_1, M_2, M_3) = (0, 0, 1)$, it is written in the circuit 503. When $(N_1, N_2, N_3) = (1, 0, 0)$, the circuit 501 is read, whne $(N_1, N_2, N_3) = (0, 1, 0)$, the circuit 502 is read, and when $(N_1, N_2, N_3) = (0, 0, 1)$, the circuit 503 is read. As seen from FIG. 8, $M_i$ is not equal to $N_i$ ($M_{iA} \neq N_i$). In the read and write operations of the circuit 501, when $M_1 = 1$, AND gates 201 and 203 are opened and AND gates 202 and 204 are closed. Accordingly, a first stage flip-flop of the shift register 205 is set by the synchronizing signal $V_B$ while the flip-flops of the other stages are reset. That is, the shift register 205 assumes a state 100...0. As the signal d is received, the state changes to 010...0, thence to 0010...0. The signal $U_1$ is equal to the output f of the oscillator 19 and it provides write clocks $\phi_1$ and $\phi_2$ to the memory circuit 206. Since the signal d shifts the shift register 205 for every other horizontal scan of the synchronizing signal $H_B$, the information for every other horizontal scan is stored in each memory circuit. Symbol v denotes the video signal. When $N_1 = 1$, the AND gates 201 and 203 are closed while the AND gates 202 and 204 are opened. In this case, the shift register 205 is set by the signal $V_A$ to a state 100...0, and as the signal $H_A$ is received, the state is changed to 0100...0, thence to 0010...0. The signal $U_1$ is equal to the output e of the AND gate 22 and it provides read clocks $\phi_1$ and $\phi_2$ for the memory circuit 202. The reading rate is equal to the oscillation frequency of the oscillator 18.

FIG. 3 shows a relation among the vertical synchronizing signal for the channel A, the vertical synchronizing signal for the channel B, and the read and write of the image information for the channel B. A signal portion $B_1$ is written in the circuit 501, a signal portion $B_2$ is written in the circuit 502 and a signal portion $B_3$ is written in the circuit 503, and they are read at the corresponding number areas shown on the channel A signal. On the right side of each broken line, the horizontal sweep is carried out in the area B shown in FIG. 2.

FIG. 6 shows a configuration of the memory circuit. The shift signals $\phi_1$ and $\phi_2$ are square wave and out-of-phase. $V_1$, $V_2$ and $V_3$ denote voltages at capacitors $C_1$, $C_2$ and $C_3$, respectively. $U_k$ denotes a sample of a signal. When a base voltage of a transistor reaches a voltage U, it starts to conduct and a current flows from the capacitor immediately succeeding thereto until the capacitor in the preceding stage is charged to the voltage U. The voltage at that stage momentarily reaches 2U and the charge is moved until the voltage reaches $U + U_k$. Therefore, the information contained in that stage is transferred to the succeeding stage. G denotes a gate signal.

The description thus far explained is directed to the display of the image of another channel at the right lower corner of the screen of the television receiver at the size compressed by the factor of 2 both vertically and horizontally. The size of the compressed image can be changed by changing the count capacities of the counters 15 and 16 and replacing the flip-flop 12 with a counter having an appropriate count capacity. The display position need not be limited to the right lower corner but it may be displayed at the right upper corner, left upper corner or the left lower corner.

In this manner, the image for the sub-channel can be displayed on a portion of the image for the main channel, but depending on the images displayed, it is difficult to distinguish the images for the two channels from each other and a viewer may feel obstacle sense.

SUMMARY OF THE INVENTION

It is, therefore, an object of the present invention to provide a television receiver capable of simultaneously displaying multi-image while displaying a boundary between a main channel image and a sub-channel image.

According to the present invention, a boundary signal indicating the boundary between the main channel image and the sub-channel image is produced from a synchronizing signal extracted from a video signal for the main channel or the sub-channel.

In one embodiment of the present invention, the boundary signal is produced from the synchronizing signal extracted from the main channel signal and an output of an oscillator which is in synchronism with the synchronizing signal, and the boundary signal is superimposed on one or both of a brightness signal and a chrominance signal or substituted therewith to display the boundary.

In another embodiment of the present invention, the boundary signal is produced from the synchronizing signal extracted from the sub-channel signal and the boundary signal is superimposed on the sub-channel signal or substituted therewith and stored in a memory circuit together with the video signal, and the content of the memory circuit is then read out to obtain the boundary signal.

BRIEF DESCRIPTION OF THE DRAWINGS

FIGS. 7, 8 and 9 show circuits for producing signals to be supplied to the circuit of FIG. 5.

FIG. 10 shows a chart for explaining the operation of a signal selection circuit shown in FIG. 1.

FIG. 11 shows a chart for explaining the operation of a ring counter which produces signals $M_1$, $M_2$ and $M_3$ to be supplied to the circuit of FIG. 9.

DESCRIPTION OF THE PREFERRED EMBODIMENTS

Referring to FIGS. 12 to 15, one embodiment of the present invention is explained.

Figure 1:
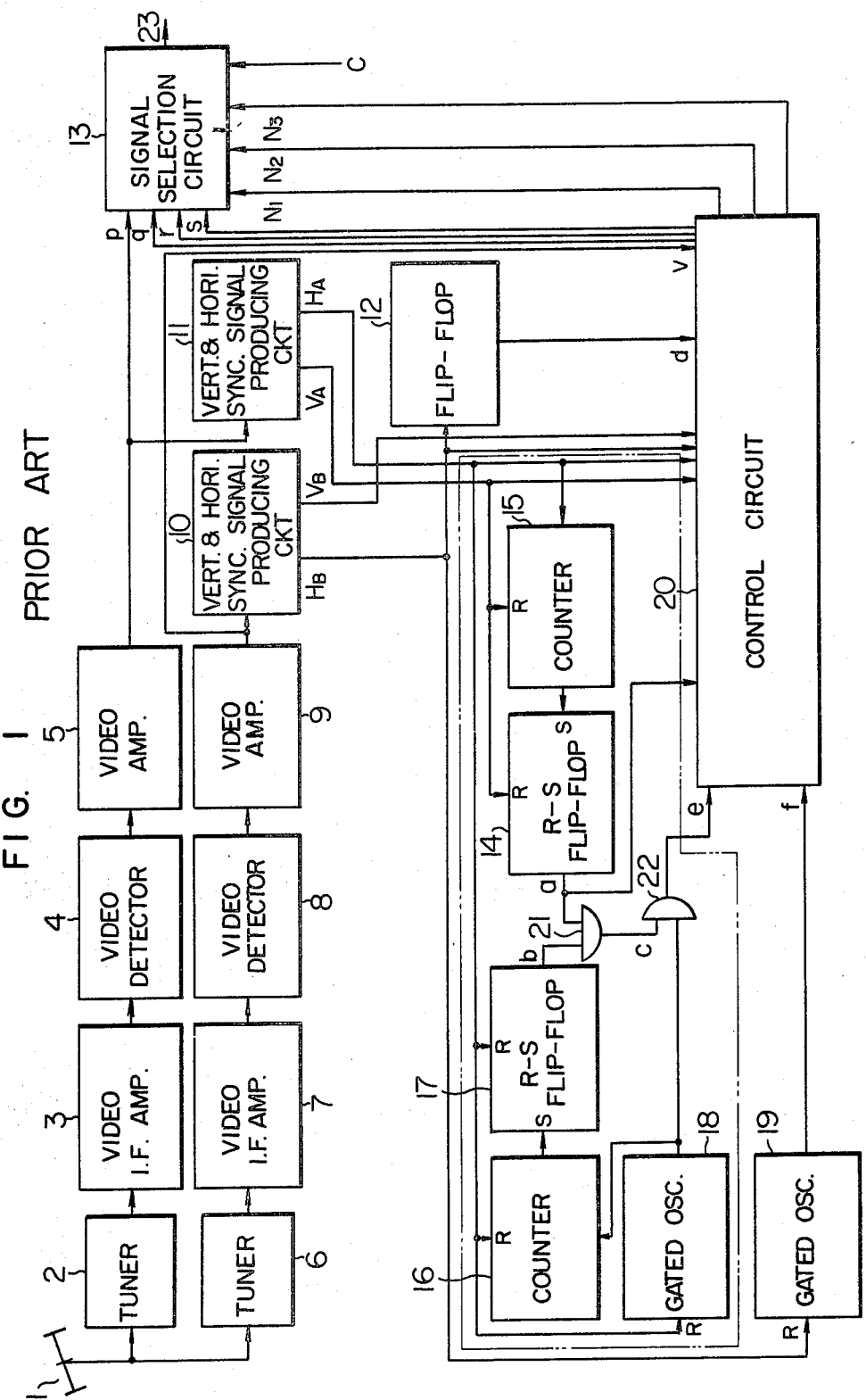
FIG. 1 is a block diagram of a prior art dual-picture television receiver.
Figure 2:
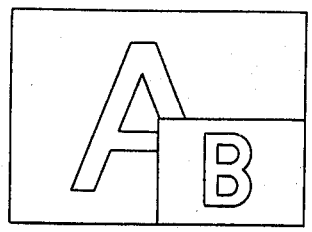
FIG. 2 shows a picture image displayed on a screen of the television receiver of FIG. 1.
Figure 3:
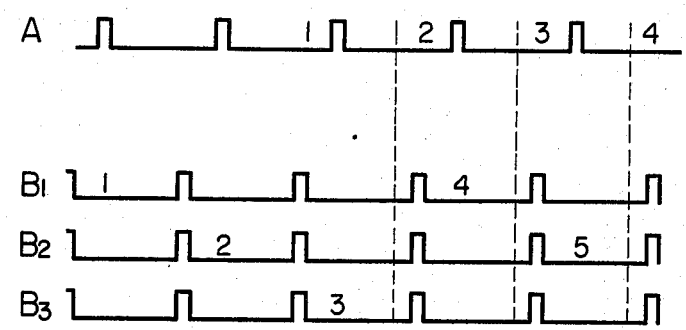
FIG. 3 shows a timing chart for reading and writing operations of a memory circuit of the television receiver of FIG. 1.
Figure 4A:
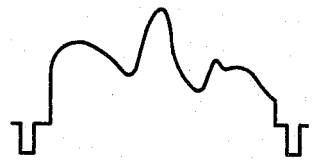
FIGS. 4A, 4B, 4C and 4D show relations between video signals for channels A and B to be simultaneously displayed.
Figure 4B:
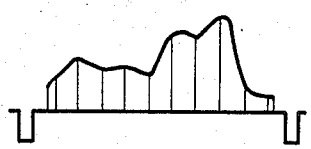
Figure 4C:
Figure 4D:
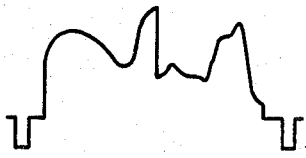
Figure 5:
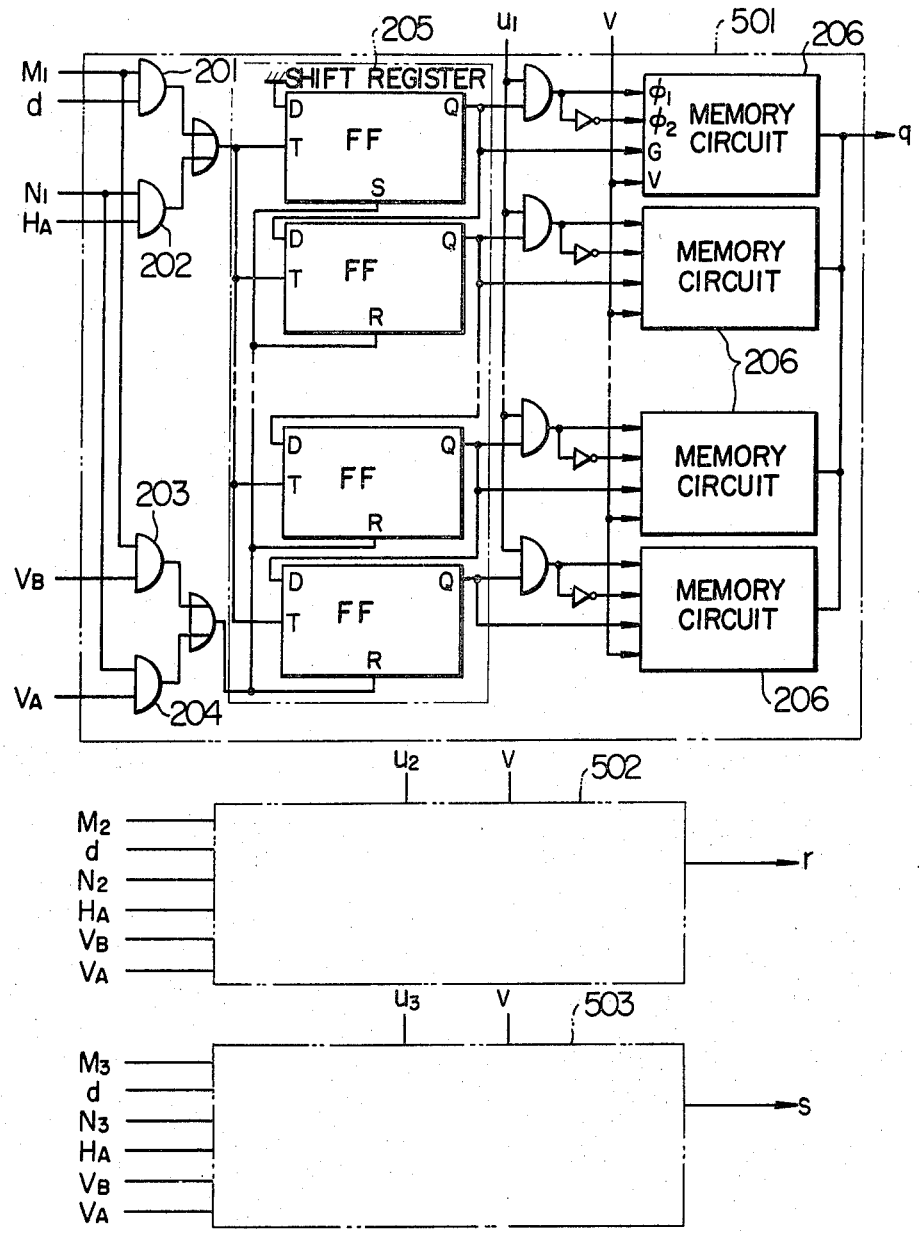
FIG. 5 shows the memory circuit shown in FIG. 1 and a read and write circuit therefor.
Figure 6:
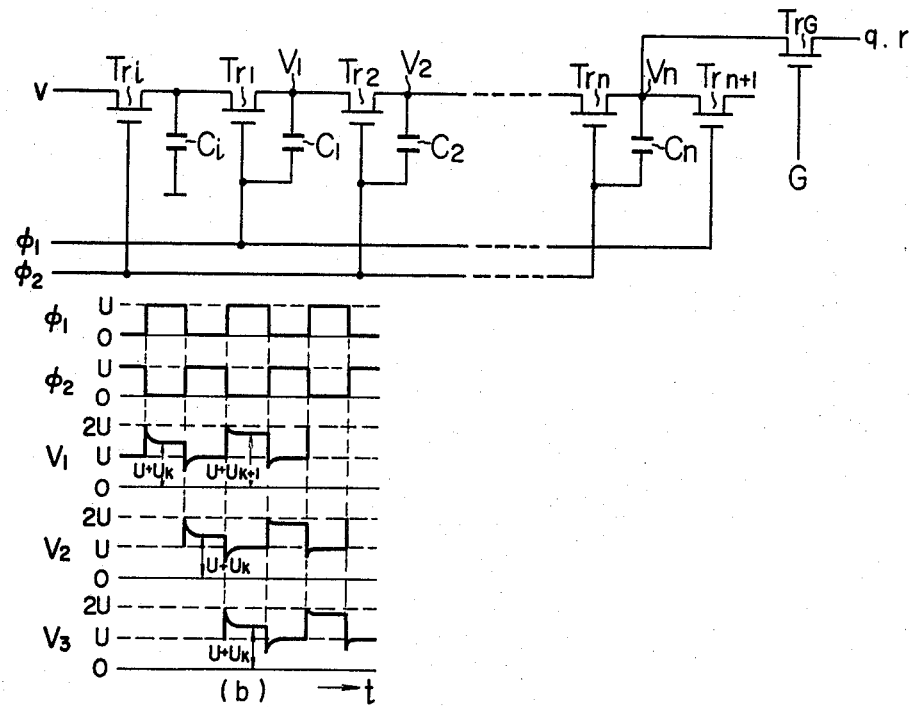
FIG. 6 shows the memory circuit and a timing chart for illustrating the operation thereof.
Figure 7:
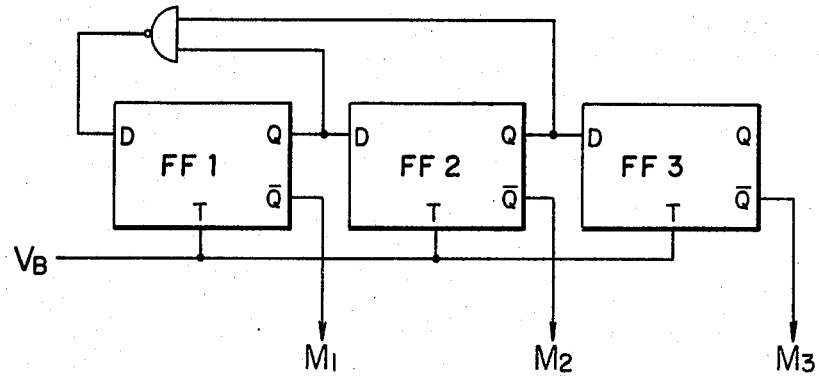
Figure 12:
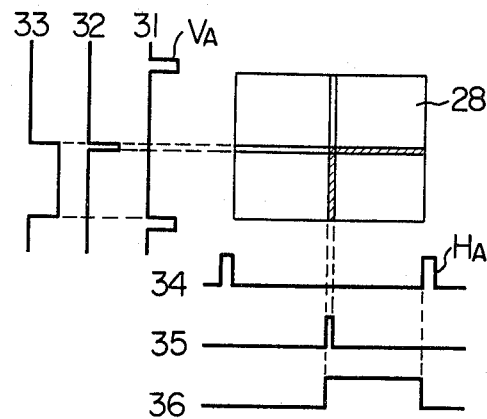
FIGS. 12 and 13 show relations between waveforms at major points in preferred embodiments of the television receiver of the present invention and images displayed.
Figure 14:
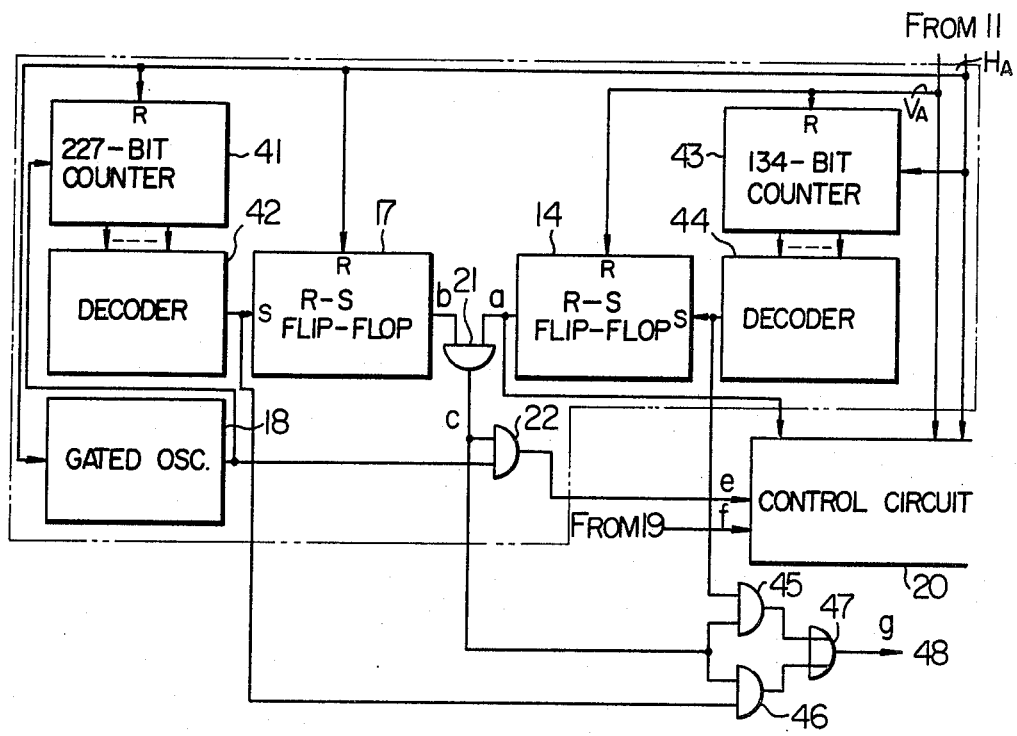
FIGS. 14 and 15 show block diagrams of the embodiments corresponding to FIGS. 12 and 13, respectively.

In FIG. 12, numeral 28 denotes a display screen in which a hatched area shows a boundary line of A and B. FIG. 14 shows a circuit to be added to and modified for the block diagram of FIG. 1 in order to provide the boundary line. A block encircled by a broken line in FIG. 1 is modified as shown by a block encircled by a broken line in FIG. 14. In FIG. 14, like numerals denote like components to those in FIG. 1. Numeral 41 denotes a counter counting larger than 227 pulses, which corresponds to the counter 16 in FIG. 1, and numeral 42 denotes a decoder which produces a "1" output when the count of the counter 41 reaches a predetermined count, in the illustrated embodiment a count of 225, and produces "0" output at a count of 227. Numeral 43 denotes a counter counting larger than 134 pulses, which corresponds to the counter 15 in FIG. 1, and numeral 44 denotes a decoder which produces a "1" output when the count of the counter reaches a predetermined count or a count of 132 in the illustrated embodiment and produces a "0" output at a count of 133. AND circuits 45 and 46 and an OR circuit 47 are additional components. The decoders which operate in the manner described above may be constructed by inverters, AND circuits and OR circuits, as is well known. The counter 41 is reset by the horizontal synchronizing signal $H_A$ (pulse 34 in FIG. 12) from a synchronization separation circuit 11 and it counts the output pulses of the gated oscillator 18. When it counts 225 pulses, the decoder 42 produces the "1" output and the output of the decoder 42 is reset to "0" by the 227th pulse. The decoder 42 produces an output pulse 35 when the count of the counter 41 reaches a predetermined count. When the number of picture elements in one horizontal period is equal to 450, a pulse having a duration corresponding to two picture elements is produced when the horizontal sweep reaches the center of the screen, that is, at the position of the pulse 35. A pulse 36 is a gate pulse which is produced at the time when the image for the channel B is to be displayed. The pulse 36 is derived from the output b of the flip-flop 17. The flip-flop 17 is reset by the rise of the synchronizing signal $H_A$ and set by the rise of the output of the decoder 42. The counter 43 is reset by the pulse $V_A$ shown by 31 in FIG. 12. It counts the synchronizing signals $H_A$ and when it counts 132 signals the decoder 44 produces the "1" output and the output of the decoder changes to "0" at the 133rd $H_A$ pulse. As a result, the decoder 44 produces a pulse 32 shown in FIG. 12. When the number of horizontal scan lines in one field is equal to 525/2, the pulse 32 shown in FIG. 12 is produced when the vertical scan reaches the center of the screen. Since the pulse is similarly produced in the next field, the pusle extends over two horizontal scan lines in one frame. A pulse 33 is the gate pulse a which is produced at the time when the image for the channel B is to be displayed and it is derived from an output of the flip-flop 14 which is reset by the rise of $V_A$ and set by the rise of the output of the decoder 44.

Thus, by ANDing the outputs a and b of the flip-flops 14 and 17, respectively, to produce a signal c, ANDing the signal c with the pulses 32 and 35 in FIG. 12, respectively in AND circuits 45 and 46, respectively, and ORing the outputs of the AND circuits 45 and 46 in an OR circuit 47, a signal g which occurs at the hatched area on the display screen 28 is produced. By superimposing the signal g on one or both of the brightness signal and the chrominance signal or substituting the signal g with those signals, the boundary line between the channel A and the channel B can be displayed.

Figure 13:
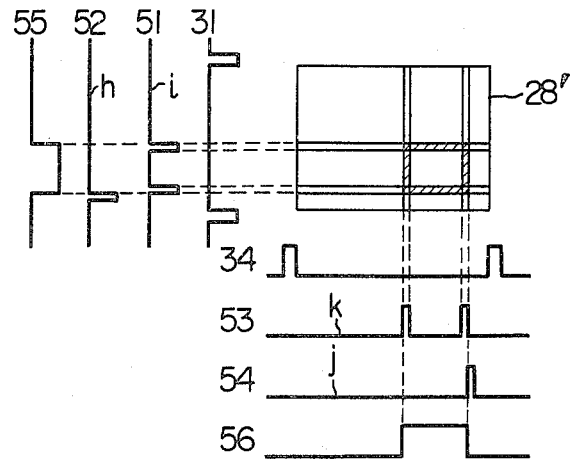
Figure 15:
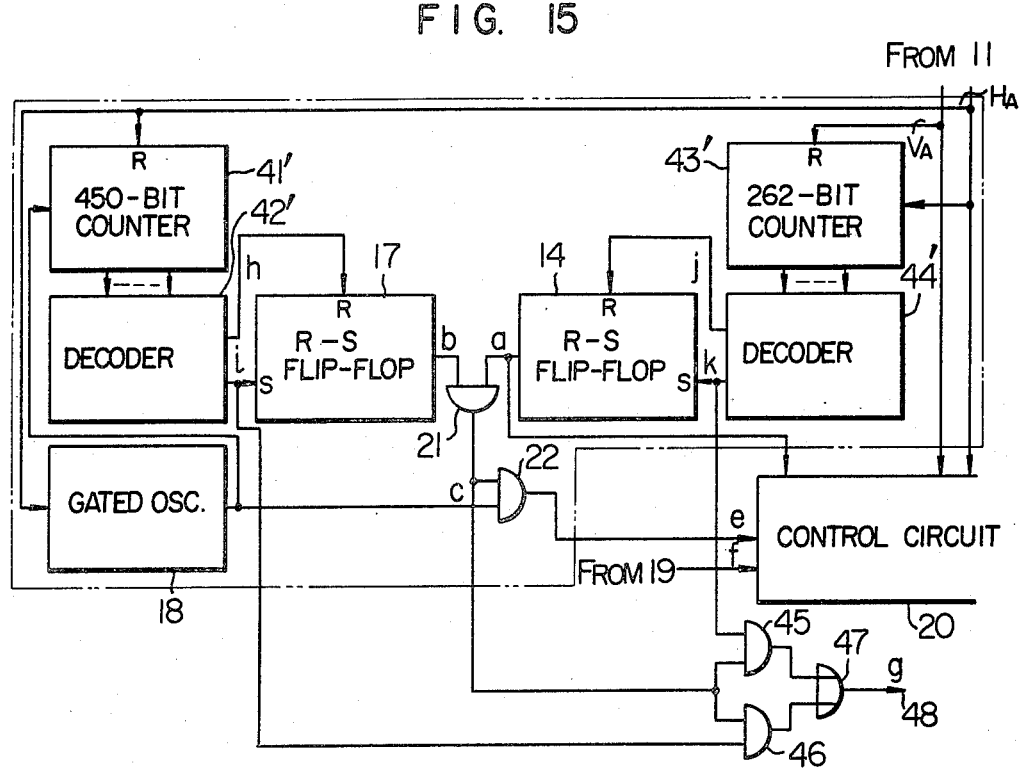

When the image for the channel B is to be displayed as shown in FIG. 13, it is necessary to display boundary lines along the four sides of the image of the channel B. In this case, the circuit differs from the above embodiment in that the bit capacities of counters 41' and 43' are larger than those of the counters 41 and 43, decoders 42' and 44' produce output pulses for a plurality of counts of the counters 41' and 42', and the flip-flops 17 and 14 are reset by the outputs of the decoders 42' and 44', respectively. In the illustrated embodiment, the counter 41' counts larger than 450 pulses and the counter 43' counts larger than 262 pulses, respectively, and the decoder 42' produces a pulse i shown by 51 in FIG. 13 which assumes "1" level at the 225th and the 443rd picture elements and restores to "0" level at the 227th and 445th picture elements. The decoder 42' also produces a pulse h shown by 52 in FIG. 13 which assumes "1" level at the 445th picture element and restores to "0" level at the 446th picture element. Similarly, the decoder 44' produces a pulse k shown by 53 which assumes "1" levels at the 132nd and 257th picture elements and restores to "0" level at the 133rd and 258th picture elements, and a pulse j shown by 54 which assumes "1" level at the 258th picture element and restores to "0 " level at the 259 th picture element. The R-S flip-flops 14 and 17 are set by the pulses k and i, respectively, a reset by the pulses j and h, respectively, to produce gate pulses 55 and 56, respectively, shown in FIG. 13. Like in FIG. 14, the pulses i and k from the decoders 42' and 44' and the output c of the AND circuit 21 are applied to the AND circuits 46 and 45, respectively, and the outputs of the AND circuits 46 and 45 are ORed in the OR circuit 47 to produce at the terminal 48 the signal g corresponding to the hatched area on the display screen 28'.

In the above explanation, since the counters 41, 41', 43 and 43' are reset by $H_A$ and $V_A$, respectively, the bit capacities of the counters need only be larger than the counts corresponding to the positions of the boundary indicating signals, and the position of the boundary indicating signal and the width of the boundary line can be set to any desired values by changing the configurations of the decoders 42, 42', 44 and 44'.

In the embodiments described above, the boundary signal is produced from the synchronizing signal for the channel A and it is superimposed on the brightness signal or the chrominance signal or it is substituted therewith to display the boundary line. Alternatively, the boundary indicating signal may be produced from the synchronizing signal for the sub-channel and it is stored in a memory circuit together with the video signal for the channel B and it is then read for display with the video signal for the main channel to display the boundary line. An embodiment thereof is explained below with reference to FIGS. 16 to 19.

Figure 16:
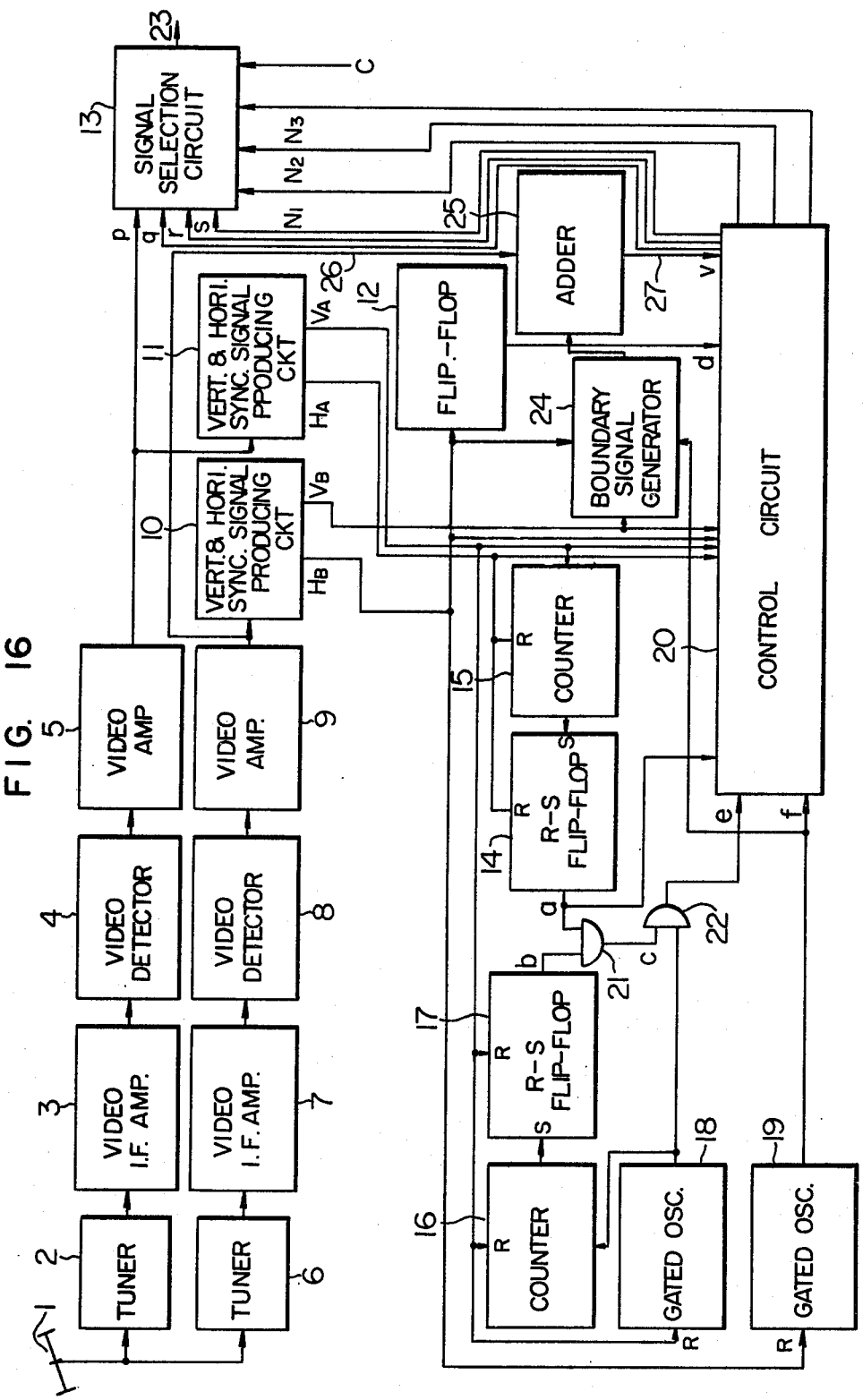
FIG. 16 shows a block diagram of another embodiment of the present invention.

FIG. 16 shows an overall block diagram of the present embodiment. All blocks other than blocks 24 and 25 are identical to corresponding blocks shown in FIG. 1.

Figure 17:
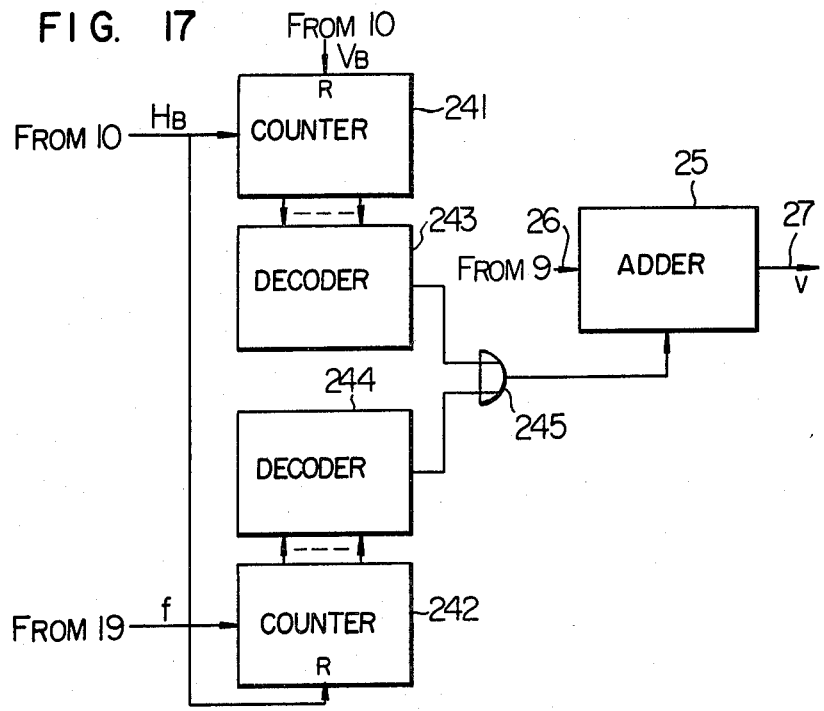
FIG. 17 shows a block diagram of a major portion of FIG. 16.

FIG. 17 shows a detailed circuit of the block 24. Numeral 241 denotes a counter which is reset by the vertical synchronizing signal $V_B$ and counts the horizontal synchronizing signals $H_B$ for the channel B, numeral 242 denotes a counter which is reset by $H_B$ and counts the output pulses f of the gated oscillator 19, and numerals 243 and 244 denote decoders which produce outputs when the counts of the counters 241 and 242, respectively, reach predetermined counts. The counter 241 is reset by the vertical synchronizing signal $V_B$ for the channel B and the counter 242 is reset by $H_{BH}$.

Figure 18:
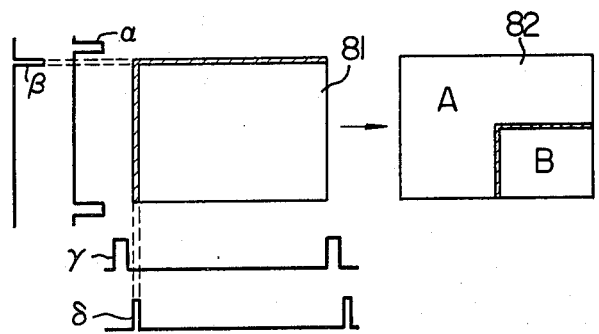
FIGS. 18 and 19 show charts for illustrating the operation of the television receiver of FIG. 17.
Figure 19:
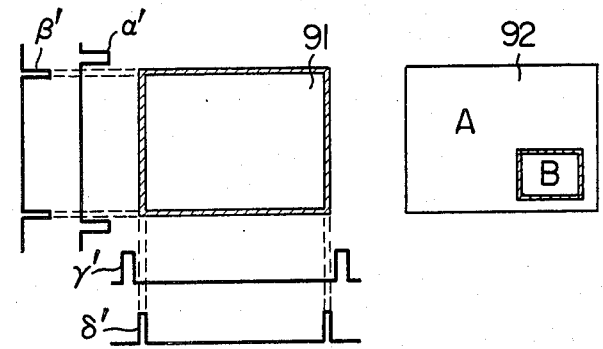

FIGS. 18 and 19 show the occurrence of the boundary signal on an actual display screen. In FIG. 18, the image for the channel B is displayed at the right lower corner of the screen 82 so that only two boundary lines are needed. A pulse α denotes the vertical synchronizing signal $V_B$, a pulse β denotes the output of the decoder 243, a pulse γ denotes the horizontal synchronizing signal and a pulse δ denotes the output of the decoder 244. In this embodiment, the decoders 243 and 244 produce the "1" signal when the counters 241 and 242 count the first $H_B$ and the pulse f, respectively, and they are reset to "0" state when the counters 241 and 242 count the second and third pulses, respectively. The resulting outputs are applied to an OR circuit 245 which produces a boundary signal corresponding to the hatched area 81 in FIG. 18. The boundary signal is superimposed on the video signal for the channel B in the adder circuit 25 or substituted for the video signal, and stored in the memory circuit.

Numeral 81 in FIG. 18 shows an image when it is displayed on a CRT tube in a normal state without compressing the output of the circuit 25. The hatched area shows the boundary line. In actual, since the readout of the memory circuit is carried out at a rate which is twice as high as the write rate, the signal is compressed so that the image for the channel B is displayed on a portion of the image for the channel A with the image for the channel B being bordered by the boundary line as shown by the image 82.

FIG. 19 shows a method for displaying the boundary lines along the four sides of the image for the channel B which is displayed as shown by the image 92. In this case, the decoders 243 and 244 are designed to produce outputs at two positions, respectively, as shown in FIG. 19. To this end, the decoder 243 is constructed to produce an output β', in addition to the output shown in FIG. 18, which assumes the "1" output when the counter 241 counts the 261st $H_B$, and restores to "0" state when the counter 241 counts the next $H_B$. The decoder 244 is constructed to produce an output δ' which assumes "1" state when the counter 242 counts the 223rd clock pulses f and restores to "0" state at the 225th pulse. The decoders which operate in the manner described above may be constructed by inverters, AND circuits and OR circuits, as is well known.

The width of the boundary line is two-picture element width in the horizontal direction and two-horizontal scan line width in the vertical direction in one frame. It may be set to any desired width by changing the configurations of the decoders so that the pulse widths of the outputs β' and δ' are changed.

What is claimed is:

1. A television receiver for receiving two different television signals, writing the first television signal into a storing means, reading said first television signal from said storing means to produce a television signal having a time axis therof compressed and inserting the produced television signal into a portion of the second television signal to display images for the first and second televison signals on the same image screen, said television receiver comprising:
    a means for extracting at least a horizontal synchronizing signal at least from said second television signal;
    a means for generating a clock pulse signal in synchronism with said horizontal synchronizing signal;
    a line counter means for counting said horizontal synchronizing signal;
    a clock counter means for counting said clock pulse signal;
    a switching control means responsive to outputs from said line counter means and said clock counter means for generating a switching control signal for switching between the compressed first television signal and the second television signal;
    a boundary signal generating means responsive to the outputs of said line counter means and said clock counter means for generating a boundary signal representing a boundary of the displayed images for said first and second television signals; and
    a means for displaying said boundary signal with said first and second television signals.

2. A television receiver according to claim 1, wherein said boundary signal generating means includes:
    a first decoding means responsive to the output of said line counter means for generating a first signal;
    a second decoding means responsive to the output of said clock counter means for generating a second signal; and
    a circuit means for combining said first signal and said second signal to produce the boundary signal.

3. A television receiver according to claim 2, wherein said first decoding means and second decoding means each produce two pulse signals as the first and second signals in response to two different counting states of said line counter means and said clock counter means, respectively.

4. A television receiver according to claim 1, wheren said boundary signal generating means includes:
    a first decoding circuit responsive to the output of said line counter means for generating a first decode signal;
    a second decoding circuit responsive to the output of said clock counter means for generating a second decode signal;
    a first flip-flop circuit responsive to the output from said first decoding circuit;
    a second flip-flop circuit responsive to the output from said second decoding circuit;
    a boundary signal generating circuit responsive to the outputs from said first decoding circuit, said second decoding circuit, said first flip-flop circuit and said second flip-flop circuit for producing the boundary signal.

5. A television receiver according to claim 4, wherein said first flip-flop circuit is reset by a vertical synchronizing signal derived from the second television signal, and said second flip-flop circuit is reset by said horizontal synchronizing signal.

6. A television receiver comprising:
    a means for simultaneously receiving first and second television signals;
    a means for deriving at least horizontal synchronizing signals from the first and second television signals;
    a clock signal generating means for generating a first clock signal and a second clock signal in synchronism with the horizontal synchronizing signals of the first television signal and of the second television signal, respectively;

a means for writing the second television signal in a storing means with said second clock signal;

a means for reading said storing means at a rate different from the writing rate with the first clock signal to derive a time-compressed second television signal;

a means for substituting a portion of said first television signal with said time-compressed second television signal to display said second television signal on a portion of an image screen for said first television signal;

a line counter means for counting the horizontal synchronizing signal of the first television signal;

a clock counter means for counting said first clock pulse signal;

a first boundary signal generating means responsive to the output of said line counter means for generating a first pair of pulse signals corresponding to two different counting states of said line counter means, said first pair of pulse signals representing parts of a boundary of the displayed images for said first and second television signals;

a second boundary signal generating means responsive to the output of said clock counter means for generating a second pair of pulse signals corresponding to two different counting states of said clock counter means, said second pair of pulse signals representing parts of the boundary of the displayed images; and a means for displaying said first and second pairs of pulse signals with said first and second television signals.

7. A television receiver according to claim 6, wherein said first boundary signal generating means includes a first decoding circuit responsive to the output of said line counter means for generating at least a first and a second pulse signal and a first reset signal, and a first flip-flop circuit which is set by an earlier pulse signal of said first and second pulse signals or another output of said first decoding circuit and reset by said first reset signal; and wherein said second boundary signal generating means includes a second decoding circuit responsive to the output of said clock counter means for generating at least a third and a fourth pulse signal and a second reset signal, and a second flip-flop circuit which is set by an earlier pulse signal of said third and fourth pulse signals or another output of said second decoding circuit and reset by said second reset signal.

* * * * *